United States Patent [19]

Judd

[11] 4,319,423
[45] Mar. 16, 1982

[54] BARRIER STRUCTURE FOR CONTROLLING GROUND CRAWLING, NON-BURROWING INSECTS

[76] Inventor: Melvin L. Judd, 35411 252nd S.E., Auburn, Wash. 98002

[21] Appl. No.: 153,449

[22] Filed: May 27, 1980

[51] Int. Cl.³ .............................................. A01M 1/10
[52] U.S. Cl. ................................................... 43/121
[58] Field of Search ...................... 43/121, 107, 132 R

[56] References Cited

U.S. PATENT DOCUMENTS

| | | | |
|---|---|---|---|
| 395,678 | 1/1889 | Wiebrock | 43/107 |
| 1,373,827 | 4/1921 | Nelson et al. | 43/107 |
| 2,315,989 | 4/1943 | Tennison et al. | 43/107 |

*Primary Examiner*—James L. Jones, Jr.
*Attorney, Agent, or Firm*—Christensen, O'Connor, Johnson & Kindness

[57] ABSTRACT

A barrier structure for controlling such ground crawling, non-burrowing insects as slugs, and suitable for being placed around a garden area, is provided by elongate sections of intermediate gauge wire mesh folded lengthwise to form in transverse section an inverted L-shape having vertical and horizontal wall segments, and that is further modified to include a downwardly depending lip portion on the outboard edge of the horizontal wall segment. The barrier structure is secured by heavy gauge wire stakes to the ground so that the lower edge of the vertical wall segment is pressed down into the soil, disposing the horizontal segment and the dependent lip in a position elevated above the surrounding ground level and oriented away from the protected garden area. Ground crawling insects climb up the vertical wall segment of the barrier, and then outwardly on the horizontal segment, while upside down, until encountering the downwardly depending lip which either causes them to retreat, or to lose their hold and drop to the ground without traversing the barrier. Further embodiments include an arrangement of the insect barrier as a protective skirt adjacent the footing of a building wall to prevent insects from crawling up onto the building's exterior, and an arrangement of the barrier structure as an insect trap in which the non-traversable lip and supporting horizontal wall segment are oriented inwardly toward a confined entrapment area which may be baited with an insect attractant.

13 Claims, 4 Drawing Figures

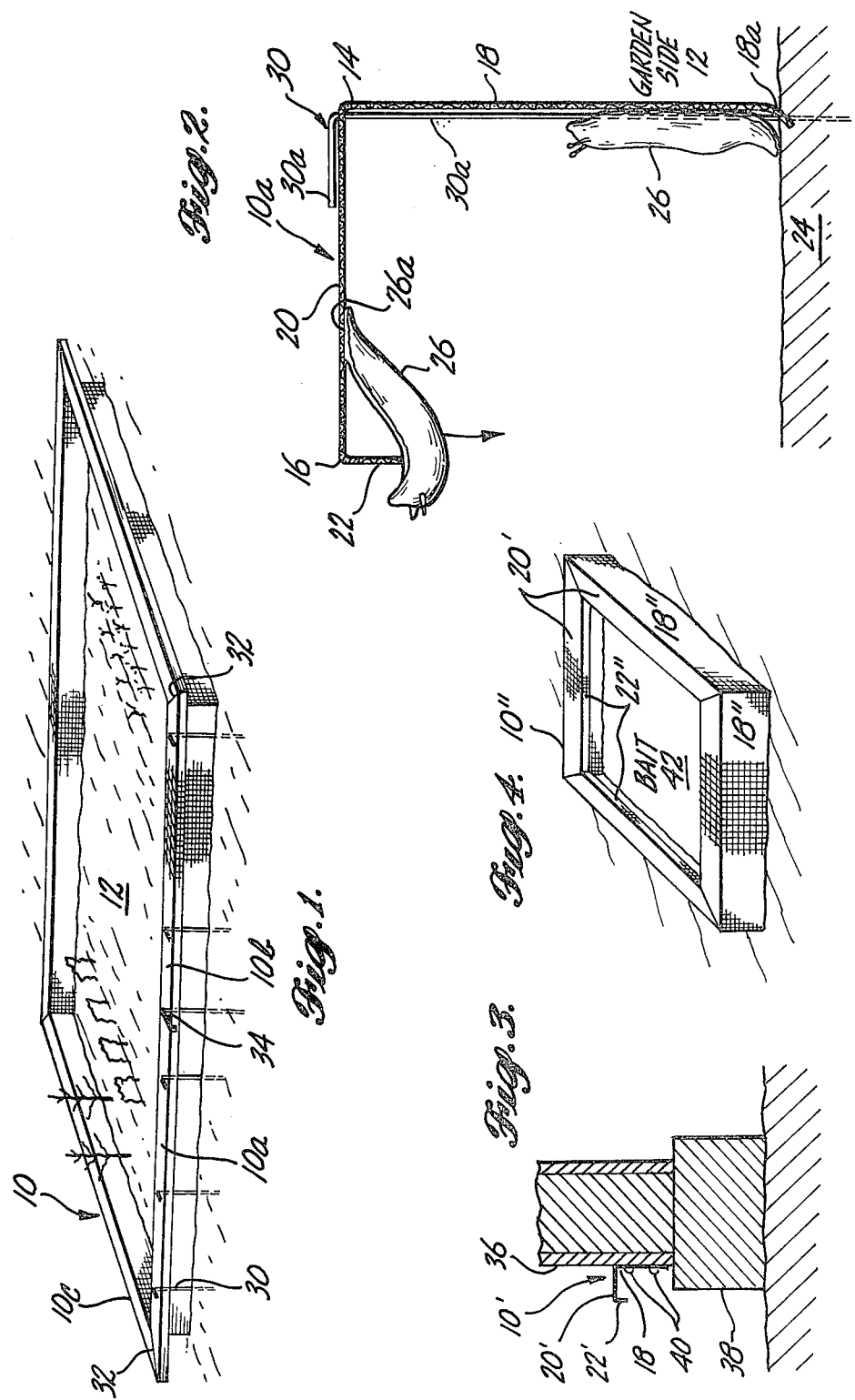

BARRIER STRUCTURE FOR CONTROLLING GROUND CRAWLING, NON-BURROWING INSECTS

BACKGROUND OF THE INVENTION

In general, the invention relates to the control of insects and, more particularly, to a barrier structure for confining worm-like, ground crawling, non-burrowing insects such as slugs, snails, moth and butterfly larva, worms and the like.

The control of such ground crawling insects has, for the most part, been by using various forms of insecticides and chemical repellents. In some cases, the insecticides are used in conjunction with various forms of trap structures which are designed to entrap the insects in a confined area where the insecticide is placed. In many cases the structure is also designed to shield the insecticide from other animals, such as household pets. The use of insecticides and chemical repellents, with or without insect trapping structures, or shields, is not always an effective control, especially in relatively small home gardens, where the surrounding area is infested with large numbers of plant devouring slugs and snails. Slugs in particular, because of their relative mobility and persistence, create an insect control problem which has not heretofore been satisfactorily solved, especially for home gardens in which the use of insect controlling chemicals is limited.

Accordingly, one object of the present invention is to provide a structural barrier that may be used for circumscribing a garden or other area to be protected, and which is almost completely effective in blocking entry of insects of the above-characterized type, and especially slugs, so that the garden area, once freed of such pests, is protected from insects that would otherwise migrate into the garden from close-by areas.

A further object of the invention is to provide an insect barrier structure that is effective, as indicated above, and is of a nature that can be mass manufactured at a low per unit cost; is easily installed; is safe for children and pets; and is relatively durable and, if damaged, is easily repairable.

A further object of the invention is to provide a multi-purpose barrier structure for controlling insects of the above-characterized type, that can be employed, as indicated above, for protecting a garden area, and can also be arranged to form an insect trap, or as a protective skirt around the lower perimeter of a building so as to prevent insects from crawling on the exterior walls and windows of the building.

SUMMARY OF THE INVENTION

In accordance with one or more of the objects of this invention, an elongate barrier structure is provided for controlling worm-like, ground crawling, non-burrowing insects of the kind characterized above, in which the barrier structure in transverse section, the shape of an inverted L, modified to include a downwardly depending lip portion along the outboard edge of the wall segment corresponding to the horizontal leg of the inverted L. The barrier is installed so that the vertical wall segment of the inverted L-shape is disposed to form an impenetrable, generally vertical, wall with respect to the surrounding ground. The horizontal wall segment is elevated with respect to ground level and the lip that depends downwardly from the outboard edge thereof is also elevated above ground level so that an insect which crawls up the vertical wall segment and outwardly on the horizontal wall segment, while upside down, is unable to traverse the lip and either retreats, or attempts to pass around the lip, loses its hold and drops by gravity to the ground.

Preferably, the barrier structure is made of wire mesh, of a gauge heavy enough to maintain the needed geometrically integrity when the mesh is folded into the above-defined inverted L-shape, and with fine enough interstices to block the passage of those insects that are to be controlled. Also, in accordance with the preferred embodiment, heavy gauge wire stakes, are used in cooperation with the interstices of the mesh to anchor the barrier structure to the ground so that the lower edge of the structure is embedded in the soil.

In an alternative embodiment, a barrier structure having the above-characterized configuration, is arranged as a skirt around the lower perimeter of a building, fence, or other similar structure to prevent insects from crawling up onto the exterior walls of such structure. In still another alternative embodiment, the barrier structure is arranged with the horizontal wall segment and dependent lip oriented inwardly toward a small area circumscribed by the barrier to form an insect trap. The interior region of the enclosed area is baited with an attractant, and insects that are initially outside the enclosed entrapment area traverse the barrier structure by crawling up the vertical wall segment, out onto the horizontal wall segment, this time while right side up, and then either drop down into the entrapment area, by falling off the lip, or by crawing around the lip, along the underside of the horizontal segment, and down the vertical wall segment. Once inside the entrapment area, they are unable to traverse the barrier in the opposite direction.

To provide a complete disclosure of the invention, reference is made to the appended drawings and following description of certain particular and currently preferred embodiments.

BRIEF DESCRIPTION OF THE DRAWINGS

FIG. 1 is an isometric view of the insect barrier structure of the invention, arranged around the perimeter of a protected garden area.

FIG. 2 is an enlarged, transverse sectional view of the barrier structure shown in FIG. 1.

FIG. 3 is a transverse sectional view of an alternative arrangement of the barrier structure in accordance with the invention.

FIG. 4 is an iosmetric view of still a further alternative arrangement of the barrier structure to form an insect trap in accordance with the invention.

DETAILED DESCRIPTION

With reference to FIG. 1, a barrier structure 10 in accordance with a currently preferred embodiment of the invention is shown to include a plurality of elongate sections 10a, 10b, 10c, etc., arranged to circumscribe a garden area 12. Each barrier section 10a, 10b and 10c is made of a wire mesh of a sufficiently heavy gauge to maintain the geometrical integrity of the barrier structure shape, when the wire mesh is folded as described below, and of fine enough gauge to provide interstices small enough to block the passage of those that are to be cntrolled.

With reference to FIG. 2, each elongate section of the wire mesh barrier structure 10, such as shown by section 10a, is formed with lengthwise extending, right angle folds 14 and 16. The fold 14 may be made at approximately midwidth of an elongate web of stock mesh, and results in a structure having a generally inverted L-shape including a vertical wall segment 18 and a horizontal wall segment 20. The inverted L-shape is further modified by the second right angle fold 16 which provides a downwardly depending lip 22 at the outboard edge of the horizontal wall segment 20. The height of lip 22 is substantially less than the height of the vertical wall segment 18, so that when section 10a of the barrier structure is arranged as shown in FIG. 2, with the lower edge 18a of vertical segment 18 in contact with or preferably slightly embedded in the soil of ground 24, the lower edge 22a of lip 22 remains elevated well above ground level, beyond the reach of an insect 26. Also, the horizontal wall segment 20 has a width, or transverse dimension, between folds 14 and 16 so that an insect 26 cannot support its body by using a foot portion 26a on the vertical wall segment 18 and supported in this fashion crawl around the outboard face of lip 22.

In particular, it has been found that the height dimension of vertical wall segment 18 and lip 22, and the width dimension of horizontal wall segment 20 are critical, and that the barrier structure is effective only when the following constraints are met. The height of vertical wall segment 18 should be great enough so as to dispose the lower edge 22a of lip 22 at a minimum of two and one-half inches above the underlying ground level. Any height larger than this minimum will work, however to maintain a barrier having a relatively low profile, and to economize on material, the two and one-half inches minimum has been found suitable for the embodiment shown in FIGS. 1 and 2. The elevational dimension of lip 22 should be a minimum of three-eighths of an inch to a maximum of one inch, with one-half inch being optimum and hence preferred. Within these constraints, an insect 26 in order to traverse the lower edge 22a of lip 22, while hanging upside down as shown in FIG. 2, is forced to detach a major part of its body from the inside corner of the wire mesh at fold 16, formed by the junction of horizontal wall segment 20 and lip 22, as illustrated. Only a rear foot portion 26a of the insect remains attached. The lip's lower edge 22a does not provide an adequate gripping structure and an attempt to traverse the lip while in the upside down position causes insect 26 to either retreat or drop to the ground, outside the protected garden area 12. Also, the interstices of the mesh present voids that decrease the effectiveness of the insect's suction, such as the suction developed on the foot of a slug or snail, thus making it harder for the insect to hold on while attempting to traverse lip 22.

To prevent insect 26 from using its rear foot portion 26a on the inside surface of the vertical wall segment 18 and extending its head and upper body therefrom so as to negotiate lip 22, the horizontal wall segment 20 has a minimum width of one and one-half inches, and for economy of material, and geometrical integrity, the maximum width of wall 20 is preferably limited to three inches. Within this range, two inches for the width of segment 20 has been found optimum.

Since the horizontal wall segment 20 and attached lip 22 have no support other than that provided by the staked vertical wall segment 18, a barrier section 10a is made of a wire mesh that has a heavy enough wire gauge to maintain the geometrical integrity of segments 18, 20 and 22 when folded and arranged as shown in FIGS. 1 and 2. For this purpose, and to meet the additional requirement of providing a sufficiently fine mesh to block insects 26, standard, commercially available hardware screen or mesh having a minimum of one-sixteenth inch square openings to a maximum of three-sixteenths inch openings is used. A finer mesh, and the accompanying finer wie, increases the effectiveness of the barrier to smaller insects, but is less than optimum in terms of providing sufficient structural rigidity to be self-supporting. Conversely, a larger gauge of mesh, may provide greater structural rigidity, but be less effective in preventing insects 20 from crawling through the openings in vertical wall segment 18. A mesh of one-eighth inch openings has been found optimum for controlling adult slugs and is preferred for this application.

By employing a mesh for a barrier section 10a selected in accordance with the foregoing constraints, each of the barrier sections 10a, 10b, 10c, etc., can be effectively supported, in a free-standing fashion, by a plurality of L-shaped wire stakes 30 having a relatively longer and vertically oriented portion 30a and a shorter, horizontal leg portion 30b as depicted in FIG. 2. Stake portion 30a is selected to have a length that exceeds the total height of wall segment 18 so as to extend several inches into the ground 24 below the lower edge 18a of wall segment 18. The gauge of wire stake 30 is selected to slide through the openings of the barrier mesh so that stake portion 30a can be passed through an opening adjacent fold 14 and then threaded through another mesh opening in an inwardly bent portion of wall segment 18 adjacent its lower edge 18a, again as shown in FIG. 2. The shorter and horizontal leg portion 30a of stake 30 is turned in the direction of projection of the horizontal wall segment 20, so that when stake 30 is forced into the ground, portion 30a presses down against the top side of wall segment 20 securing the barrier in place.

For convenience, barrier sections 10a, 10b, 10c, etc., are provided in suitable lengths, such as three-feet long sections, which may be nested together for storing and transporting. To form any corners needed for circumscribing a protected area 12, lip 22 and the horizontal wall segment 20 are cut along appropriate diagonals. For example, to form the right angle corners 32 of barrier structure 10 as shown in FIG. 1, one end of a barrier section, such as 10a is cut along the horizontal wall segment 20 at a 45° angle to remove a 45° triangular portion therefrom, and then the corresponding square portion of vertical wall segment 18a may be either cut away or folded at a right angle and lapped on to the abutting vertical wall segment of barrier section 10c, the horizontal wall segment of which is cut to provide a mating 45° diagonal. The resulting corner structure maintains the basic geometry of the barrier by providing a horizontal wall segment and depending lip that is horizontally offset from the vertical wall segment. Inside corners may be formed as shown in the alternative embodiment of FIG. 4, by cutting out inwardly convergent right angle notches from the horizontal wall segment 20, including lip 22, and then folding the uncut vertical wall segment 18 along a vertical fold line to form the outside corner, with the cut edges of the horizontal wall segment 20 and lip 22 abutting to complete the inside corner. At each of corners 32, and at any location where the barrier sections overlap or abut, as shown at abutment 34 between sections 10a and 10b, light gauge wire is used to tie the otherwise free edges of the mesh together to form a relatively sturdy assembled structure.

With reference to FIG. 3, an alternative embodiment is shown in the form of a barrier structure 10' arranged as a skirt around the lower perimeter of a building. Barrier structure 10' is provided by a wire mesh, shaped like the above-described barrier structure 10 of FIGS. 1 and 2. However, rather than being staked to the ground, structure 10' is secured to a wall 36 of the building adjacent a footing 38. The vertical wall segment 18' of structure 10' is secured to wall 36 by suitable fasteners 40 and the horizontal wall segment 20' and lip 22' project outwardly, and downwardly respectively, from wall 36. The portion of wall 36 beneath the lower edge of barrier structure 10' and the footing 38 form in essence a downward continuation of the vertical wall of the barrier structure so that insects which crawl upwardly on footing 38 and from there on to wall segment 18' are blocked by lip 22' in the same manner as described above in connection with FIG. 2. The barrier protects the exterior sides and windows of the building from defacement by crawling insects especially slugs and snails.

With reference to FIG. 4, a still further alternative embodiment is shown, in which the barrier structure 10" has been arranged to form a baited trap. In this case the non-traversable side of barrier structure 10", including the horizontal wall segment 20" and the associated lip 22" are disposed so as to be oriented inwardly toward an entrapment area 42. Area 42 may be baited with a suitable attractant. Insects, which are unrestrained from crawling up the outside surface of the vertical wall segments 18", attempt to enter area 42 and in doing so will either reach lip 22" and fall into area 42, or in some cases may be able to negotiate the lip 22" by maintaining a hold on the upper surface of wall segment 20" and the outer face of lip 22". In either case, once the insects have entered area 42, they are unable to escape because of their inability to traverse lip 22" in the opposite direction as described above in connection with FIG. 2.

While only particular embodiments have been disclosed herein, it will be readily apparent to persons skilled in the art that numerous changes and modifications can be made thereto, including the use of equivalent means and devices, without departing from the spirit of the invention.

The embodiments of the invention in which an exclusive property or privilege is claimed are defined as follows:

1. An article of manufacture for use in controlling worm-like, ground crawling, non-burrowing insects such as slugs, snails, moth and butterfly larva, worms and the like, comprising:
   a barrier structure made of an elongate web of substantially rigid flat mesh material that is folded lengthwise so that in transverse section the web has the shape of an inverted L including a vertical wall segment having a lower edge, a horizontal wall segment joined to an upper extent of said vertical wall segment and projecting horizontally and outwardly therefrom, and a lip segment formed along an outboard edge of said horizontal wall segment and oriented to depend downwardly therefrom substantially at right angles to said horizontal wall segment, said barrier structure being adapted for installation so that said vertical wall segment forms relative to the ground a vertical obstruction to such insects and so that the horizontal wall segment and lip segment are elevated above ground and together present a non-traversible barrier to those insects which have crawled up the vertical wall segment and along the underside of the horizontal wall segment.

2. The article of claim 1, wherein said barrier structure is arranged to circumscribe an area.

3. The article of claim 2 wherein said horizontal wall segment is oriented to project outwardly of the circumscribed said area so as to present a barrier to the entry of the insects into said area.

4. The article of claim 1, wherein said mesh material is wire screen, and further comprises a plurality of stake means for securing said barrier structure to the ground.

5. The article in claim 1 wherein said mesh material comprises a wire screen having a gauge selected so that when folded into said segments, it maintains said inverted L shape and so that the interstices of the mesh material prevent those insects that are to be controlled from passing directly through the walls of said barrier structure.

6. The article of claim 1 wherein said mesh material has interstices within the range of one-sixteenth inch openings to and including three-sixteenth inch openings.

7. The article of claim 1 wherein said horizontal wall segment has a minimum width of one and one-half inches, and said lip segment has a height within the range of three-eights of an inch to and including one inch.

8. A trap for worm-like, ground crawling, non-burrowing insects such as slugs, snails, moth and butterfly larva, worms and the like, comprising:
   a barrier structure adapted for enclosing an entrapment area, said barrier structure having traversible and non-traversible sides and being arranged so that said traversible side faces outwardly away from said entrapment area and said non-traversible side faces inwardly toward said entrapment area, said barrier structure comprising a support wall extending along a perimeter of said entrapment area and an elevated, elongated horizontal wall supported along one of its edges by said support wall so as to project in a substantially horizontal plane outward from said non-traversible side of the barrier structure, and so as to be elevated above a surface level of said entrapment area, and an elongated lip joined lengthwise to the non-supported edge of said horizontal wall, said horizontal wall and lip each being formed from a substantially rigid flat mesh material and when viewed in transverse section said lip projecting downwardly at a substantially right angle from said horizontal wall, said support wall, horizontal wall and said lip being relatively sized and arranged so that a lower edge of said lip is supported in a position elevated above the level of said entrapment area.

9. An article of manufacture for use in controlling worm-like, ground crawling, non-burrowing insects such as slugs, snails, moth and butterfly larva, worms and the like, comprising:
   an elongate barrier structure comprising a strip of flat substantially rigid mesh folded lengthwise along one edge at a right angle bend to form a lip that depends from a relatively wider segment of said strip of mesh, said strip of mesh adapted for being arranged in an operative position elevated above ground level by a supporting wall the lower extent of which is in contact with ground wherein said wider segment of said strip of mesh projects widthwise outwardly and horizontally from the supporting wall and said lip depends downwardly at a substantially right angle so as to present a non-tranversible barrier at said lip to insects which have reached the underside of the horizontally disposed wider segment of said strips of mesh by crawling up the supporting wall from ground level.

10. The article of claim 9, wherein said strip of mesh comprises wire screen.

11. The article of claim 10, wherein said wire screen has interstices within the range of one-sixteenth inch openings to and including three-sixteenth inch openings.

12. The article of claim 10 wherein said wider segment of said strip of mesh has a minimum width of one and one-half inches, and said lip has a height within the range of three-eights of an inch to and including one inch.

13. The article of claim 9, wherein said supporting wall comprises, in part, an exterior wall of a building, and said strip of mesh projects outwardly from said building wall at a location elevated above ground, whereby said barrier structure protects those portions of the building wall above said barrier structure from said insects.

* * * * *